3,190,915
REACTION PRODUCTS OF CYANAMIDES AND BORANES AND THEIR PREPARATION

Marvin M. Fein, Westfield, and Jack Bobinski, Rockaway, N.J., assignors to Thiokol Chemical Corporation, Bristol, Pa., a corporation of Delaware
No Drawing. Filed Dec. 2, 1959, Ser. No. 856,876
7 Claims. (Cl. 260—551)

This invention relates to solid reaction products of cyanamides and boranes.

The solid products of this invention when incorporated with suitable oxidizers such as ammonium perchlorate, potassium perchlorate, sodium perchlorate, ammonium nitrate and etc., yield solid propellants suitable for rocket power plants and other jet propelled devices. Such propellants burn with high flame speeds, have high heats of combustion and are of the high specific impulse type. Probably the single most important factor in determining the performance of a propellant charge is the specific impulse, and appreciable increases in performance will result in the use of the higher specific impulse material. The products of this invention when incorporated with oxidizers are capable of being formed into a wide variety of grains, tablets, and shapes, all with desirable mechanical and chemical properties. Propellants produced by the methods described in this application burn uniformly without disintegration when ignited by conventional means, such as a pyrotechnic type igniter, and are mechanically strong enough to withstand ordinary handling.

The solid reaction products of this invention are prepared by reacting a cyanamide of the formula

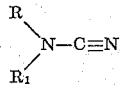

wherein R and $R_1$ are each hydrogen or lower alkyl radicals, with a decaborane or a lower alkyl decaborane wherein the alkyl groups contain 1 to 5 carbon atoms.

Suitable cyanamides include cyanamide, methylcyanamide, ethylcyanamide, n-propyl cyanamide, isopropylcyanamide, n-butyl cyanamide, n-amylcyanamide, dimethylcyanamide, diethylcyanamide, di-n-propylcyanamide, diisopropylcyanamide, di-n-butylcyanamide, methylethylcyanamide, n-amylethylcyanamide, and the like.

Decaborane is a solid boron hydride well known to the art. Lower alkyl decaboranes can be prepared, for example, according to the method described in application Serial No. 54,141, filed October 12, 1955, now U.S. Patent No. 3,109,030, of Altwicker et al.

The ratio of reactants can be varied widely, generally being in the range from 0.01 to 10 moles of cyanamide per mole of borane, preferably 1 to 5:1. The reaction temperature can vary from 0° to 100° C. and the pressure can vary from subatmospheric to several atmospheres, although atmospheric pressure is preferred. The reaction is a substitution reaction and the degree of completeness of the reaction can be determined by the rate and quantity of hydrogen evoltuion. Also the rate at which solid products form and precipitate from the solution indicates the degree of completion of the reaction. The reaction to go to completion generally requires about 3 to 50 hours depending upon the ratio of reactants, the particular borane and cyanamide utilized, and the temperature and pressure employed.

Although the reaction will proceed in the absence of a solvent, best results are obtained, especially where solid reactants are employed, by carrying out the reaction in a solvent common for the reactants but inert with respect to the reactants. Such solvents include aliphatic hydrocarbon solvents such as n-pentane, hexane and heptane, aromatic hydrocarbon solvents such as benzene, toluene and xylene, cycloaliphatic solvents such as cyclohexane and methylcyclopentane and oxygenated organic solvents such as dioxane, ethyl acetate, and diisopropyl ether. The amount of solvent can vary widely but is generally within the range of about 1 to 100 moles per mole of each reactant. When a solvent is employed, it is preferred to carry out the reaction at the reflux temperature of the solvent.

The process of the invention is illustrated in detail by the following examples which are to be considered not limitative.

Example I

A 300 ml. three-necked glass flask was equipped with a magnetic stirrer, thermometer, dropping funnel with a bypass and a reflux condenser having a drying tube leading to a wet test meter which monitored gas evolution. This flask was charged with 6.1 g. (0.05 mole) of decaborane in 200 cc. of dry benzene. The stirrer was started and to this mixture, through the dropping funnel, was added over about a 15 minute period a solution of 3.5 g. (0.05 mole) of dimethylcyanamide in 50 cc. of dry benzene. The reaction mixture was then heated to reflux (approximately 85° C.) and gas evolution was monitored. After 28 hours of heating 0.325 liter (0.05 mole) of gas identified as hydrogen had evolved. When the stirrer and heating were stopped, it was observed that a solid precipitated out of the solution, sticking to the walls of the flask. The reaction mixture was filtered and 6.0 grams of a hard solid were isolated which decomposed with gas evolution at 126°–130° C. and did not melt below 350° C. Infrared spectrophotometric analysis revealed B–H and C–H bonds and no starting materials. The solid was analyzed and found to contain 39.9% boron and 18.2% nitrogen. This compares favorably with 41.5% boron and 21.5% nitrogen theoretically contained in a substitution product of two moles of dimethylcyanamide and 1 mole of decaborane.

The mother liquor was stripped of benzene and an additional 2.0 g. of solid was isolated. This solid was purified by solution in 80 cc. of benzene followed by precipitation with 200 cc. of n-heptane. The gray powder thus isolated became thermoplastic at 110° C. Analysis showed that this solid contained 44.7% boron and 8.5% nitrogen.

Example II

The same equipment used in Example I was employed in this example. To the flask were charged 6.1 g. (0.05 mole) of decaborane, 1.7 g. (0.025 mole) of dimethylcyanamide, and 250 ml. of n-heptane. The reaction mixture was heated at 45° C. for 4 hours. There was obtained 0.8 gram of a solid precipitate which did not melt below 250° C.

The mother liquor contained about 5.5 g. of decaborane.

Example III

Into a 500 ml. flask equipped with a mechanical stirrer were charged 6.1 g. (0.05 mole) of decaborane, 3.5 g. (0.05 mole) dimethylcyanamide, 80 ml. of benzene and 200 ml. of n-heptane. The reaction mixture was stirred for 48 hours at room temperature. 1.8 grams of a solid precipitate were obtained which decomposed with gas evolution at about 128° C. but which did not melt below 350° C. The residue separated from the mother liquor weighed 4.8 grams, and melted at 80–82° C. with gas evolution.

Example IV

Into a 500 ml. flask equipped with a mechanical stirrer were charged 6.1 g. (0.05 mole) of decaborane, 7 g. (0.1 mole) of dimethylcyanamide, 80 ml. of benzene and 200 ml. of n-heptane. The reaction mixture was stirred for 48 hours at room temperature. 4.1 grams of a solid precipitate were obtained which decomposed with gas evolution at 127–130° C. The mother liquor contained 1.6 grams of a solid which melted at 78–82° C. with gas evolution.

*Example V*

Into a 500 ml. flask equipped with a mechanical stirrer were charged 6.1 g. (0.05 mole) of decaborane, 1.75 g. (0.025 mole) of dimethylcyanamide, 80 ml. of benzene and 200 ml. of n-heptane. The reaction mixture was stirred for 48 hours at room temperature. 1.3 grams of a solid precipitate were obtained which decomposed at 128–130° C. with gas evolution but which did not melt below 300° C. The mother liquor contained 6.3 grams of a solid which melted at 79–82° C. with gas evolution.

*Example VI*

Into a 500 ml. flask equipped with a mechanical stirrer were charged 6.1 g. (0.05 mole) of decaborane, 14 g. (0.2 mole) of dimethylacetamide, 80 ml. of benzene and 200 ml. of n-heptane. The reaction mixture was stirred for 48 hours at room temperature. There were separated from the reaction mixture 9.7 grams of a viscous transparent liquid which, on drying under reduced pressure, turned into a hard solid similar to the precipitates of Examples I through V.

*Example VII*

Into a 500 ml. flask equipped with a mechanical stirrer were charged 6.1 g. (0.05 mole) of decaborane, 0.88 g. (0.0125 mole) of dimethylcyanamide, 80 ml. of benzene and 200 ml. of n-heptane. The reaction mixture was stirred for 48 hours at room temperature. 0.2 gram of a solid precipitate was obtained which decomposed at 128°–130° C. but did not melt below 300° C. The mother liquor contained 6.0 grams of a solid which melted at about 96° C.

*Example VIII*

The equipment employed in Example I was used in this example. Into the flask were charged 1.5 g. (0.01 mole) of monoethyldecaborane ($C_2H_5B_{10}H_{13}$) and 0.7 g., 0.01 mole) of dimethylcyanamide in 100 ml. of dry toluene. The resulting solution was heated at about 90° C. for 24 hours. During this period 0.2 liter of gas identified as hydrogen evolved. The reaction mixture was cooled and filtered and 1.6 grams of a solid was obtained which partially melted, when heated above 100 °C., with swelling and evolution of gas.

The boron containing solid materials produced by practicing the methods of this invention, can be employed as ingredients of solid propellant compositions in accordance with general procedures which are well understood in the art, inasmuch as the solids produced are readily oxidized using conventional solid oxidizers such as ammonium perchlorate, potassium perchlorate, sodium perchlorate and the like. In formulating a solid propellant composition employing one of the materials produced in accordance with the present invention, generally from 5 to 35 parts by weight of boron containing material and from 65 to 95 parts by weight of oxidizer are present in the final propellant composition. In the propellant, the oxidizer and the product of the present process are formulated in intimate admixture with each other, as by finely dividing each of the materials separately and thereafter intimately mixing them. The purpose of doing this, as the art is well aware, is to provide proper burning characteristics of the final propellant. In addition to the oxidizer and the oxidizable material, the final propellant can also contain an artificial resin generally of the urea-formaldehyde or phenol-formaldehyde type, the function of the resin being to give the propellant mechanical strength and at the same time improve its burning characteristics. Thus, in manufacturing a suitable propellant, proper proportions of finely divided oxidizer and finely divided boron containing material can be admixed with a high solids content solution of partially condensed urea-formaldehyde or phenol-formaldehyde resin, the proportions being such that the amount of resin is about 5 to 10 percent by weight based on the weight of oxidizer and boron compound. The ingredients are thoroughly mixed with the simultaneous removal of solvent, and following this the solvent free mixture is molded into the desired shape, as by extrusion. Thereafter the resin can be cured by resorting to heating at moderate temperatures. For further information concerning the formulation of solid propellant compositions, a reference is made to U.S. Patent 2,622,277 to Bonnell and U.S. Patent 2,646,596 to Thomas.

We claim:
1. A process for the preparation of solid reaction products of cyanamides and boranes which comprises reacting from 0.01 to 10 moles of dimethylcyanamide per mole of a borane selected from the class consisting of decaborane and lower alkyl decaboranes wherein the alkyl groups contain 1 to 5 carbon atoms.
2. A process for the preparation of solid reaction products of cyanamides and boranes which comprises reacting at a temperature of 0° to 100° C. in the presence of a solvent inert with respect to the reactants from 0.01 to 10 moles of dimethylcyanamide per mole of a borane selected from the class consisting of decaborane and lower alkyl decaboranes wherein the alkyl groups contain 1 to 5 carbon atoms.
3. The process of claim 2 wherein the borane is decaborane.
4. The process of claim 2 wherein the borane is monoethyldecaborane.
5. The product produced by the process of claim 1.
6. The product produced by the process of claim 3.
7. The product produced by the process of claim 4.

OTHER REFERENCES

Hawthorne et al.: J. Am. Chem. Soc., vol. 80, p. 6685 (Dec. 20, 1958).

IRVING MARCUS, *Primary Examiner.*

ROGER L. CAMPBELL, *Examiner.*